United States Patent
Menke

(10) Patent No.: US 7,980,229 B2
(45) Date of Patent: Jul. 19, 2011

(54) TANK VENTILATION SYSTEM AND METHOD FOR TANK VENTILATION

(75) Inventor: Andreas Menke, Weingarten (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 205 days.

(21) Appl. No.: 12/400,031

(22) Filed: Mar. 9, 2009

(65) Prior Publication Data

US 2009/0250122 A1    Oct. 8, 2009

(30) Foreign Application Priority Data

Apr. 3, 2008  (DE) ................. 10 2008 017 004

(51) Int. Cl.
*F02M 33/04* (2006.01)
*F02M 33/02* (2006.01)

(52) U.S. Cl. .................. 123/519; 123/198 D

(58) Field of Classification Search .......... 123/519, 123/518, 516, 520, 198 D; 137/587, 588, 137/589

See application file for complete search history.

(56) References Cited

U.S. PATENT DOCUMENTS

| 4,285,440 | A | * | 8/1981 | Adams | 220/202 |
| 4,790,349 | A | * | 12/1988 | Harris | 137/587 |
| 5,044,397 | A | * | 9/1991 | Szlaga et al. | 137/587 |
| 5,197,442 | A | * | 3/1993 | Blumenstock et al. | 123/520 |
| 5,259,355 | A | * | 11/1993 | Nakashima et al. | 123/520 |
| 6,305,361 | B1 | * | 10/2001 | Takaku et al. | 123/520 |

FOREIGN PATENT DOCUMENTS

| DE | 40 40 895 | 9/1999 |
| JP | 5202812 | 8/2008 |

* cited by examiner

*Primary Examiner* — Mahmoud Gimie
(74) *Attorney, Agent, or Firm* — Gerald E. Hespos; Michael J. Porco

(57) ABSTRACT

A tank ventilation system for a motor vehicle includes a tank (1) for combustible fuels. An activated carbon filter (20) is connected to the tank (1) via a connecting line (7) and adsorbs hydrocarbon vapors of the tank (1) for deaeration. An electrically activatable check valve (30) is in the connecting line. A differential pressure sensor (3) measures the pressure difference between the vapor chamber (21) of the tank (1) and the environment. The connecting line is formed without a vacuum valve. A mechanical vacuum valve (6) is provided for tank aeration with respect to the environment. The check valve is closed if the pressure difference measured by the differential pressure sensor is below a fixed, positive threshold value, and is open if the pressure difference is above the threshold value.

15 Claims, 1 Drawing Sheet

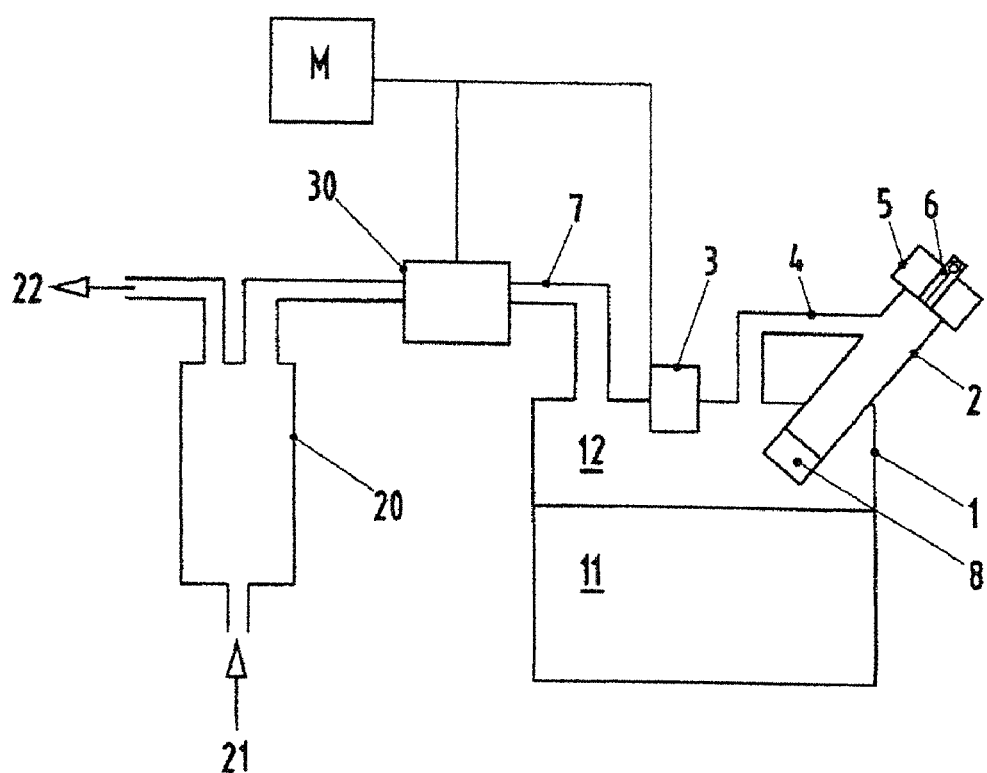
Fig.

TANK VENTILATION SYSTEM AND METHOD FOR TANK VENTILATION

CROSS-REFERENCE TO RELATED APPLICATIONS

This application claims priority under 35 USC 119 to German Patent Application No. 10 2008 017004.6 filed on Apr. 3, 2008, the entire disclosure of which is incorporated herein by reference.

BACKGROUND OF THE INVENTION

1. Field of the Invention

The invention relates to a tank ventilation system and to a method for tank ventilation.

2. Description of the Related Art

Motor vehicles conventionally have an activated carbon filter between the environment and the tank that supplies the internal combustion engine with combustible fuel. The activated carbon filter functions as a buffer for fuel vapors from the vapor chamber of the tank, and specifically from those regions of the tank that are not filled with fuel. The activated carbon filter is regenerated or purged on demand with a fresh air flow that is conducted over the hydrocarbon-laden carbon particles. The fresh air flow absorbs the hydrocarbons and transports the hydrocarbons to the internal combustion engine. The hydrocarbon-laden air flow from the activated carbon filter then is admixed to the combustion air and is burned with the combustion air.

The internal combustion engine is operated only intermittently in a hybrid vehicle or a vehicle with an automatic start/stop function. This intermittent operation of the internal combustion engine may cause some purging cycles to be omitted. There is a risk, therefore, that the activated carbon filter can no longer absorb the incoming hydrocarbon vapors and "overflows". To prevent this, the tank internal pressure may be increased above the ambient pressure to reduce the quantity of hydrocarbon vapors generated in the tank and thus to reduce the supplied quantity of hydrocarbon vapors. Such an approach is known from the generic DE 40 40 895.

In view of the above situation, objects of the invention are to improve tank ventilation and to define an improved method for ventilating a tank.

SUMMARY OF THE INVENTION

The invention is based on the general concept of consistently separating electrical and mechanical ventilation components from one another. The electrically controllable/regulable components are assigned to the overpressure region, namely, to the deaeration of the tank, and the mechanical components are assigned to the vacuum region, namely, the aeration of the tank. As a result, only the desired overpressure in the tank is controlled or regulated electrically. A particularly simple control or regulating arrangement with only a single, fixed threshold value preferably is provided for this purpose. For example, a check valve is opened if the threshold value for the tank internal pressure is exceeded so that the fuel vapors are conducted into the activated carbon filter. The check valve is closed again if the single, fixed threshold value is undershot so that a desired pressurization of the tank is attained.

The protection of the tank against a vacuum is separated strictly from the deaeration controls and is realized in a purely mechanical fashion. More particularly, a mechanical vacuum valve is provided for protection of the tank against a vacuum. However, the mechanical vacuum valve specifically is not arranged in the connecting line between the vapor region of the tank and the activated carbon filter. This is because a vacuum valve that is arranged in this way only can perform its protective function to a restricted extent, for example, in the event that the activated carbon filter is frozen up. For this purpose, the mechanical vacuum valve is disposed for complete spatial separation from the connecting line that has the electrical check valve, in such a way that the vapor region of the tank is aerated with respect to the environment. This is because, with a vacuum valve, it is to be ensured specifically that no fuel vapors pass from the tank into the environment. Therefore, in this case, it is also not necessary for aeration to take place via the activated carbon filter, but rather it is possible for aeration to take place directly from the environment. In summary, the invention results in a simple yet safe option for increasing the pressure in a tank of a motor vehicle.

The consistent separation of electrical and mechanical components results in both a reliable mechanical vacuum protection arrangement and also a particularly simple electrical overpressure regulating arrangement. In the case of conventional motor vehicles with a plastic tank, it is possible to obtain a pressure increase in the tank in a structurally simple manner, and therefore it is possible to retrofit the motor vehicle, for example, for the use of start/stop systems or hybrid drives.

A threshold value to be used in a motor vehicle with a plastic tank preferably is not excessively high. Provision preferably is made here of a value of up to 25 hPa, since at the relatively low overpressure, the generation of hydrocarbon vapors can be reduced satisfactorily without the possibility of problems occurring when opening the tank cover, for example, a discharge of fuel. It is therefore possible to dispense with an expensive and complex detection of a tank filling process or of the tank cover being open. This results in a structurally simple pressurized tank system for a motor vehicle.

It is also possible here to check whether the motor vehicle is in operation, for example, by checking whether the speed of the vehicle is greater than zero or by detecting whether a seat is occupied. This is because, in such cases, a tank filling process usually takes place only subsequently. In other words, control or regulation to a relatively low tank excess pressure at which the subsequent discharge of fuel in the event of a tank filling process must be prevented is necessary only while driving the motor vehicle. It is possible to permit a relatively high excess pressure value in the event of a relatively long standstill, since it can be expected that the tank cover will not be opened imminently. In this case, a mechanical overpressure protection valve preferably is provided parallel to the electrical check valve to ensure a permissible or technically possible tank internal pressure when the motor vehicle is at a standstill.

Alternatively, a fixed threshold value may be provided in a range above 25 hPa, for example between 100 and 300 hPa. This represents the region that conventional fuel tanks can technically withstand as an overpressure. In this case, however, it would be necessary to take precautions to detect an opening of the tank for the purpose of tank filling, since at such high pressures, there is the possibility of fuel being discharged when the tank cover is opened.

The mechanical vacuum valve preferably is provided in the vapor chamber of the tank and is spatially separate from the electrically activatable check valve. It is possible to select a suitable range for this purpose. A reliable vacuum protection function is ensured by means of the structurally very simple solution.

The preferred placement of a vacuum protection valve in the vapor chamber of the tank may not be possible due to installation space conditions. In this situation, it is possible for a separate connecting line to be provided between the vapor chamber of the tank and the filler neck in the region of the tank cover. The mechanical vacuum valve then can be located in the tank cover itself, where sufficient installation space is always available. This slightly more complex construction permits a reliable mechanical vacuum protection even with restricted installation space available in the tank.

The invention will now be explained in more detail on the basis of a drawing.

BRIEF DESCRIPTION OF THE DRAWING

The single FIGURE schematically shows a preferred embodiment of a tank ventilation system in accordance with the invention.

DETAILED DESCRIPTION OF THE PREFERRED EMBODIMENT

The FIGURE illustrates a tank ventilation system for a tank 1. The tank 1 can be filled with fuel 11 via a filler neck 2. A vapor chamber 12 is situated above the fuel 11 and defines that region of the tank 1 that is not filled with fuel 11. A tank cover 5 is provided to close off the filler neck 2. More particularly, the tank cover 5 is removed to open the filler neck 2 and the fuel 11 then is filled into the tank 1 through the filler neck 2. A differential pressure sensor 3 is provided for measuring the tank internal pressure as a pressure difference between the vapor chamber 12 of the tank and the environment. An activated carbon filter 20 is provided to adsorb the fuel vapors. The activated carbon filter 20 is connected to the vapor chamber 12 of the tank 1 via a connecting line 7. The connecting line 7 has an electrically activatable check valve 30. The check valve 30 normally is closed, and no fuel vapor can pass from the tank 1 into the activated carbon filter 20 when the check valve 30 is closed. The electrically activatable check valve 30 and the differential pressure sensor 3 are the only electrical components in the illustrated arrangement, and are controlled or regulated by electronics M. The activated carbon filter 20 can be regenerated by supplying the activated carbon filter 20 with fresh air through an opening 21. The fresh air releases the hydrocarbons that have been adsorbed in the activated carbon filter 20 and conducts the hydrocarbons through a line 22 to the internal combustion engine, where the hydrocarbon-laden air then is burned in the internal combustion engine.

The vapor chamber 12 in the tank 1 is closed off by virtue of both the check valve 30 and the tank cover 5, both of which are normally closed. Heat can be introduced into the tank 1, and particularly into the fuel 11, from many sources, including waste heat of the internal combustion engine, heat of the exhaust system, heat of the electric fuel pump of the motor vehicle, the heat recirculation of a fuel supply (not illustrated) of the internal combustion engine from the tank 1 and from other sources. The introduction of heat into the tank 1, and particularly into the fuel 11, causes a volume expansion and leads to an increased pressure in the vapor chamber 12 of the tank 1, and specifically an increased tank internal pressure. The desired pressure increase results in a reduced generation of fuel vapors of the fuel 11 in the vapor chamber 12. The differential pressure sensor 3 reliably monitors the tank internal pressure. The check valve 30 remains closed for as long as the tank internal pressure is below a fixed, positive threshold value. Here, the fixed, positive threshold value is tank-specific, that is to say is dependent only on the specific construction of the tank 1. However, the check valve 30 opens once the tank internal pressure becomes greater than the fixed, positive threshold value. In this way, the hydrocarbon vapors are conducted from the vapor region 12 via the connecting line 7 into the activated carbon filter 20 where they are adsorbed. As a result, the tank internal pressure falls again. The check valve 30 is closed once the tank internal pressure is measured as lying below the fixed, positive threshold value again.

A desired positive tank internal pressure can be set in the tank 1 by means of the corresponding control or regulation of the electrical check valve 30 by the electronics M. The use of a single, fixed threshold value for controlling or regulating the check valve 30 results in particularly simple overpressure regulation for the tank 1.

In contrast, a mechanical vacuum valve 6 is provided in the tank cover 5 for aerating the tank 1 with respect to the environment and to provide vacuum protection. The tank cover 5 closes off the tank neck 2 and the tank neck 2 conventionally is closed off at the tank side by an anti-spray protection valve 8. Therefore, no free exchange is possible between the fuel vapors in the region of the filler neck 2 and the fuel vapors in the region of the vapor chamber 12. For this purpose, a diagnostic line 4 connects the vapor chamber 12 of the tank 1 to the cover region of the tank neck 2. Thus, the mechanical vacuum valve 6 enables reliable vacuum protection of the tank 1.

The invention has been described with respect to one preferred embodiment. However, other optional embodiments will be apparent to those skilled in the art and are within this scope of the invention defined by the appended claims.

For example, the mechanical vacuum valve 6 is provided in the tank cover 5 in the illustrated embodiment. However, the mechanical vacuum valve can be at other locations provided that the mechanical vacuum valve is separated spatially from the connecting line 7 that extends between the vapor chamber 12 and the activated carbon filter 20.

A mechanical overpressure protection valve can be provided parallel to the electrical check valve 30 to ensure a permissible or technically possible tank internal pressure when the motor vehicle is at a standstill.

The tank 1 can be formed from plastic, metal or other known materials.

What is claimed is:

1. A tank ventilation system for a motor vehicle, comprising:
   a tank for combustible fuels, a vapor chamber being defined in parts of the tank that are not occupied by the combustible fuels;
   a filler neck extending from an external environment to the tank to enable filling of the tank with the combustible fuel;
   a tank cover removably mounted on the filler neck;
   a differential pressure sensor for measuring a pressure difference between the vapor chamber of the tank and the environment;
   a connecting line for deaearation communicating with the vapor chamber, the connecting line being formed without a vacuum valve;
   a mechanical vacuum valve being provided in the tank cover and separate from the connecting line for providing direct communication from the environment to the tank, the mechanical vacuum valve being configured for tank aeration with respect to the environment;
   an activated carbon filter communicating with the connecting line for adsorption of hydrocarbon vapors of the tank;

an electrically activatable check valve in the connecting line between the vapor chamber and the activated carbon filter, the check valve being closed if the pressure difference measured by the differential pressure sensor is below a fixed, positive threshold value, and being open if the pressure difference is above the threshold value.

2. The tank ventilation system of claim 1, wherein a diagnostic line extends from the vapor chamber of the tank to the filler neck.

3. The tank ventilation system of claim 1, wherein a mechanical overpressure protection valve is provided parallel to the check valve.

4. The tank ventilation system of claim 1, wherein the tank is formed from plastic.

5. The tank ventilation system of claim 1, wherein the tank is formed from sheet metal.

6. The tank ventilation system of claim 5, wherein the sheet metal is aluminum or steel.

7. The tank ventilation system of claim 1, further comprising an electronic control communicating with the differential pressure sensor and the check valve and being operative for selectively opening and closing the check valve in response to selected pressure differences between the vapor chamber of the tank and the environment.

8. A method for tank ventilation of a tank for combustible fuels in a motor vehicle, comprising the steps
continuously providing aeration of the tank via a mechanical vacuum valve in direct communication with the environment and with a filler neck of the tank;
measuring a pressure difference between a vapor chamber of the tank and the environment;
opening an electrical check valve to place portions of the valve vapor chamber of the tank spaced from the mechanical overpressure protection valve in communication with an activated carbon filter for deaeration and for adsorption of hydrocarbon vapors if the pressure difference measured by a differential pressure sensor is greater than or equal to a fixed, positive threshold value; and
closing the electrical check valve to pressurize the tank if the pressure difference measured by the differential pressure sensor is lower than said threshold value.

9. The method of claim 8, wherein the method is carried out independently of opening of a tank cover and with the fixed threshold value not exceeding a value of 25 hPa.

10. The method of claim 9, further comprising checking whether the motor vehicle is in operation, and with the method being carried out only if the motor vehicle is in operation.

11. The method of claim 8, wherein the threshold value is a fixed value above 25 hPa.

12. The method of claim 11, wherein the threshold value is between 100 and 300 hPa.

13. A tank ventilation system for a motor vehicle, comprising:
a tank for combustible fuels, a vapor chamber being defined in parts of the tank that are not occupied by the combustible fuels;
a differential pressure sensor for measuring a pressure difference between the vapor chamber of the tank and the environment;
a connecting line for deaearation communicating with the vapor chamber, the connecting line being formed without a vacuum valve;
an activated carbon filter communicating with the connecting line for adsorption of hydrocarbon vapors of the tank;
an electrically activatable check valve in the connecting line between the vapor chamber and the activated carbon filter, the check valve being closed if the pressure difference measured by the differential pressure sensor is below a fixed, positive threshold value, and being open if the pressure difference is above the threshold value; and
a mechanical vacuum valve being provided separate from the connecting line and not in direct communication with the activated carbon filter for providing direct communication from the environment into the tank, the mechanical vacuum valve being configured for tank aeration with respect to the environment.

14. The tank ventilation system of claim 13, wherein the tank has a filler neck and a tank cover removably mounted on the filler neck, the mechanical vacuum valve being provided in the tank cover of the filler neck, and wherein a diagnostic line extends from the vapor chamber of the tank to the filler neck.

15. The tank ventilation system of claim 14, further comprising an electronic control communicating with the differential pressure sensor and the check valve and being operative for selectively opening and closing the check valve in response to selected pressure differences between the vapor chamber of the tank and the environment.

* * * * *